United States Patent
Uyehara et al.

(10) Patent No.: US 7,957,323 B2
(45) Date of Patent: Jun. 7, 2011

(54) METHODS AND APPARATUS FOR EVALUATING THE SEQUENCE OF PACKETS

(75) Inventors: Carl Uyehara, Kaneohe, HI (US);
Jocelyn Kunimitsu, Honolulu, HI (US);
Craig Fujikami, Honolulu, HI (US)

(73) Assignee: Spirent Communications, Inc., Sunnyvale, CA (US)

( * ) Notice: Subject to any disclaimer, the term of this patent is extended or adjusted under 35 U.S.C. 154(b) by 128 days.

(21) Appl. No.: 12/106,935

(22) Filed: Apr. 21, 2008

(65) Prior Publication Data

US 2009/0262743 A1 Oct. 22, 2009

(51) Int. Cl.
*H04L 12/28* (2006.01)
(52) U.S. Cl. .................. 370/254; 375/224; 714/25
(58) Field of Classification Search .................. 370/235, 370/252, 229, 394, 503, 250; 714/781; 709/224
See application file for complete search history.

(56) References Cited

U.S. PATENT DOCUMENTS

| | | | |
|---|---|---|---|
| 6,252,891 B1 * | 6/2001 | Perches | 370/503 |
| 7,313,141 B2 * | 12/2007 | Kan et al. | 370/394 |
| 7,376,731 B2 * | 5/2008 | Khan et al. | 709/224 |
| 7,417,991 B1 * | 8/2008 | Crawford et al. | 370/394 |
| 2001/0050901 A1 * | 12/2001 | Love et al. | 370/235 |
| 2003/0066016 A1 * | 4/2003 | Wehage | 714/781 |
| 2006/0088060 A1 | 4/2006 | Fujikami et al. | |
| 2006/0285500 A1 * | 12/2006 | Booth et al. | 370/250 |
| 2007/0115812 A1 * | 5/2007 | Hughes | 370/229 |
| 2009/0046593 A1 * | 2/2009 | Ptasinski et al. | 370/252 |

* cited by examiner

*Primary Examiner* — Dang T Ton
*Assistant Examiner* — Lionel Preval
(74) *Attorney, Agent, or Firm* — Kenta Suzue; Haynes Beffel & Wolfeld LLP

(57) ABSTRACT

Embodiments of the invention are directed to evaluating the sequence of packets in a received packet stream. In some embodiments, when a packet in the packet stream is received, its sequence number may be determined and compared to an expected sequence number indicative of the highest received sequence number in the packet stream. If the sequence number of the packet is greater than or equal to the expected sequence number, the packet may be considered an in-order packet and a counter that counts the number of received in-order packets in the packet stream may be incremented.

27 Claims, 8 Drawing Sheets

| 103 |
| --- |
| 105 |
| 106 |
| 104 |

**Figure 1A
(prior art)**

| 101 |
| --- |
| 102 |
| 103 |
| 99 |

**Figure 1B
(prior art)**

| | packet stream 1 | packet stream 2 | | packet stream n | |
|---|---|---|---|---|---|
| Expected Sequence Number | $n_1$ | $n_2$ | ... | $n_n$ | 703 |
| Current Sequence Run Length | $x_1$ | $x_2$ | ... | $x_n$ | 705 |
| In-order Count | $y_1$ | $y_2$ | ... | $y_n$ | 707 |
| Duplicate Count | $z_1$ | $z_2$ | ... | $z_n$ | 709 |
| Re-ordered Count | $a_1$ | $a_2$ | ... | $a_n$ | 711 |
| Late Count | $b_1$ | $b_2$ | ... | $b_n$ | 713 |
| Late Threshold | $c_1$ | $c_2$ | ... | $c_n$ | 715 |
| Lost Count | $d_1$ | $d_2$ | ... | $d_n$ | 717 |

Figure 7

METHODS AND APPARATUS FOR EVALUATING THE SEQUENCE OF PACKETS

FIELD OF THE INVENTION

The invention relates to network testing devices.

DESCRIPTION OF RELATED ART

A computer network comprises multiple interconnected computer systems. In many computer networks, network devices, such as routers, switches, and hubs, are used to couple network devices and route transmitted data from its source to its destination(s). The use of such computer networks is widespread, and one of the challenges faced by the operators of these networks is protecting the network against failures and performance degradations. These failures and performance degradations can occur for any of a number of reasons, including, for example, network devices receiving network traffic at a faster rate than they are able to process it.

To test the reliability of networks and network devices, operators of the networks and manufacturers of network devices frequently use testing equipment that generates simulated network traffic, applies such traffic to network device(s), and analyzes the response of the network device(s) to determine how effectively the network device(s) can process the simulated network traffic. One approach to traffic analysis involves collection of statistics on network traffic.

SUMMARY

One embodiment is directed to a method of evaluating sequence of a packet stream comprising a plurality of packets, wherein each of the plurality of packets has an assigned sequence number. The method comprises acts of: receiving a packet of the plurality of packets; determining the sequence number of the packet; comparing the sequence number of the packet to an expected sequence number indicative of the highest received sequence number in the packet stream; determining, based on the act of comparing, whether the sequence number of the packet is greater than or equal to the expected sequence number; when it is determined that the sequence number of the packet is greater than or equal to the expected sequence number, determining that the packet is an in-order packet; and when it is determined that the packet is an in-order packet, incrementing a counter that counts the number of received in-order packets in the packet stream.

Another embodiment is directed to a method of evaluating sequence of a packet stream comprising a plurality of packets, wherein each of the plurality of packets has an assigned sequence number. The method comprises acts of: receiving a packet of the plurality of packets; determining the sequence number of the packet; based on the sequence number of the packet, determining in which of a plurality of mutually exclusive packet classifications the packet belongs; in response to determining in which of the plurality of packet classifications the packet belongs, incrementing a counter for the one of the plurality of packet classifications in which the packet belongs.

A further embodiment is directed to a packet sequence checking system comprising: at least one input for receiving packets from a plurality of packet streams; at least one memory storing a counter that counts a number of in-order packets received in one of the plurality of packet streams; and at least one circuit, coupled to the input and the memory, that: determines the sequence number of a received packet in the one of the plurality of packet streams; compares the sequence number to an expected sequence number; determines, based on the act of comparing, whether the sequence number of the received packet is greater than the expected sequence number; when it is determined that the sequence number of the received packet is greater than the expected sequence number, determines that the received packet is an in-order packet; and when it is determined that first packet is an in-order packet, increments the counter.

BRIEF DESCRIPTION OF THE DRAWINGS

FIGS. 1A and 1B are examples of a sliding window technique for tracking the sequence of packets used in some prior art systems;

FIG. 7 is a diagram of a memory that stores information usable to classify packets in a packet stream and evaluate their sequence, in accordance with some embodiments.

DETAILED DESCRIPTION

Figure 2A:
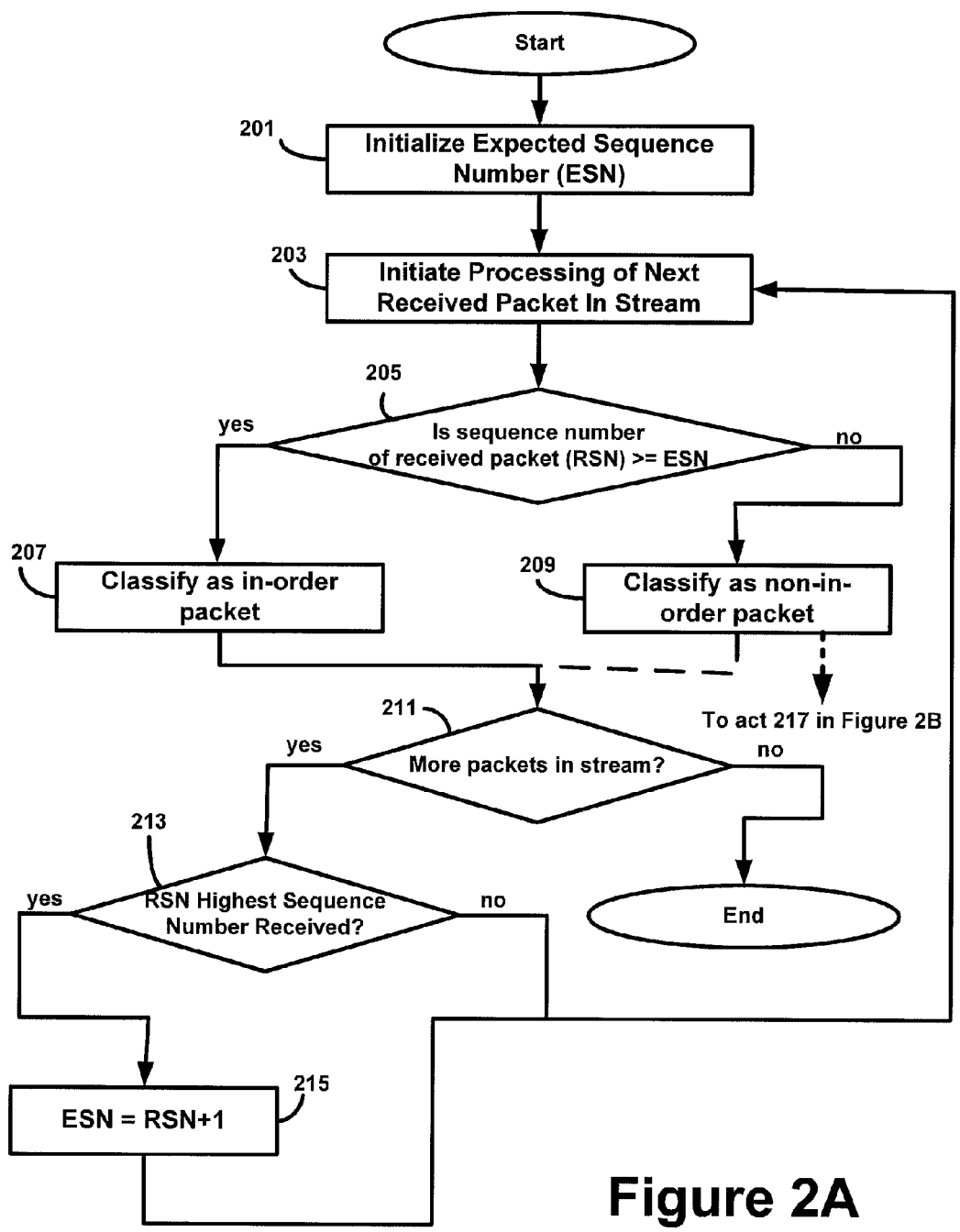
FIGS. 2A and 2B are flow charts of illustrative processes for classifying received packets, in accordance with some embodiments of the invention.

The inventors have appreciated that test equipment that collects network traffic statistics can be more accurate and more readily implemented by using an improved method of collecting packet sequence statistics. Such improved approaches may be particularly useful for testing networks operating at high data rates, such as 10 GHz and above.

In networks operating at such a high data rates, packets may arrive at rates of one packet every 100 nsec or less. For example, some network traffic streams may have one packet every 67 nsec. At these data rates, known approaches to collecting traffic statistics may be inaccurate or may entail significant amounts of expensive high speed hardware to process packet streams and may require significant amounts of high speed memory to store at least a portion of each traffic stream to support computation of traffic statistics.

For example, when using network test equipment to evaluate the response of a network device under test, a valuable metric is the extent to which the packets sent from the device under test to the network test equipment are sent in sequence. This metric may be particularly important for some types of network traffic, such as video data, where the number of lost packets, duplicate packets, and late packets may greatly impact the quality of the video displayed at the destination.

While some network prior art test instruments endeavor to measure the extent to which packets received from a device under test are out of sequence, the measurements provided by these instruments are either misleading or limited in their usefulness. For example, some instruments count the number of out-of-sequence packets by assuming that a packet is out of sequence if its sequence number is not one greater than the sequence number of the previous packet. This technique for counting out-of-sequence packets can yield misleading results as it can overcount the number of out-of-sequence packets. For example, for a given stream, a test instrument may receive the sequence of packets shown below in Table 1.

TABLE 1

101, 102, 103, 99, 104, 105, 106, 107

In the example of Table 1, the packet with sequence number 99 is received after the packet with sequence number 103. Using the above-described technique for counting out-of-sequence packets, the packet with sequence number 99 would be counted as an out-of-sequence packet because its sequence number is not one greater than the sequence number of the previously-received packet. The next packet received after the packet with sequence number 99 is the packet with sequence number 104. This packet would also be counted as an out-of-sequence packet because its sequence number is not one greater than the sequence number of the previously-received packet. Thus, a test instrument using this technique for counting out-of-sequence packets would indicate that there are two out of sequence packets in the stream shown in Table 1. However, it can be intuitively seen that the packet with sequence number 99 is the only out of sequence packet, though the measurement does not indicate that.

Other test instruments use a sliding window of packets to determine whether packets for a given stream are in sequence or out of sequence. These test instruments establish a relatively small sliding window (e.g., 32 packets) and place each received sequence number in the window, removing the oldest to make room for the newest. If the sequence number of an incoming out-of-sequence packet falls within the window, then it may be correctly counted as out of sequence. However, if the sequence number of an incoming packet falls outside the window, then it is not possible to tell whether the packet is a duplicate or one that is received late. FIGS. 1A and 1B show examples of the sliding-window technique for counting out-of-sequence packets using a sliding window of four packets. In the example of FIG. 1A, the first three packets in the window have sequence numbers 103, 105, and 106, respectively. The next packet received has sequence number 104. Because sequence number 104 falls within the window (i.e., it is in between sequence numbers 103, 105, and 106), it can be determined that the packet with sequence number 104 is out of sequence.

By contrast, in FIG. 1B, the first three packets in the window have sequence numbers 101, 102, and 103, respectively. The next packet received has sequence number 99. Because sequence number 99 falls outside of the window it cannot be determined whether a packet with sequence number 99 has already been received and this packet is a duplicate of the already-received packet, or if the packet with sequence number 99 is being received late.

One partial solution to this problem is to increase the size of the window so that it is sufficiently large to encompass, as a practical matter, any packet that is received late. However, as the size of the sliding window is increased, the amount of memory required to store the window increases and the amount of time needed to determine whether a packet is in sequence or out of sequence may increase to the point that packets are being received at a much faster rate than the rate at which a test instrument can determine whether those packets are in sequence or out of sequence. In addition, in situations where the test instrument is concurrently receiving multiple different packet streams from one or more devices under test, the amount of memory required to evaluate the sequence of these packet streams is further increased.

Some embodiments described herein address these drawbacks of prior art test instruments. However, not every embodiment addresses all of these drawbacks and some embodiments may not address any of these drawbacks. Indeed, the invention is not limited to addressing or improving any of the drawbacks of the above-described techniques for counting of sequence packets.

Some embodiments of the invention relate to a technique for evaluating the sequence of packets whereby a received packet is classified based on a comparison of packet sequence information to one or more parameters that are readily maintained in memory of a test system as a packet stream is processed. As a result, each packet can be classified based on relatively simple comparisons as it is received, without a need for comparing the packet to previously received packets.

Moreover, in some embodiments, packets in a packet stream are classified into one of a plurality of mutually exclusive classifications. That is, when a packet is received, it is classified into one (and only one) of the classifications. For each packet stream, a counter may be maintained for each classification that counts the number of received packets in the packet stream that fall into the classification.

This approach to obtaining network traffic statistics provides the advantage that, rather than having to maintain in memory, for each packet stream, a large history of sequence numbers of previously-received packets to determine whether a packet in the stream is in or out of sequence, a relatively small number of counters may be maintained for each packet stream that may be used to classify an incoming packet into one of the classifications and to keep count the number of received packets in the stream in each classification. Thus, in some embodiments, the amount of memory needed to evaluate the sequence of packets may be reduced. The processing for each received packet may also be reduced, because each packet can be processed by updating a small number of memory locations storing parameters and counters. Reduced processing may translate into faster equipment, capable of testing networks operating at higher data rates, and/or may translate into less expensive equipment. These advantages may be particularly useful in situations where multiple incoming packet streams are being processed concurrently.

Incoming packets may be classified in any suitable way into any suitable number or type of classifications, as the invention is not limited in this respect. For example, in some embodiments a classification scheme whereby received packets in a packet stream are classified as either in-order packets or non-in-order packets may be used. In some such embodiments, a technique may be used whereby a received packet in a packet stream is considered an in-order packet if its sequence number is greater than or equal to an expected sequence number. The expected sequence number is set to one greater than the sequence number of the packet in the stream that has the highest sequence number of all the packets in the stream that have yet been received. The expected sequence number is incremented each time a packet in the stream is received with a higher sequence number than the highest sequence number yet received. When this occurs, the expected sequence number is set to the sequence number of the received packet plus one. In such embodiments, packets whose sequence number is less than the expected sequence number may be considered non-in-order packets.

FIG. 2A is a flow chart of an example of a process by which packets in a stream whose sequence number is greater than or equal to the expected sequence number may be classified as in-order packets, and packets in the stream whose sequence number is less than the expected sequence number may be classified as non-in-order packets.

The process of FIG. 2A begins at act 201 where the expected sequence number (ESN) is initialized to one. The process next continues to act 203 where processing of the next packet in the stream is initiated. The process next continues to act 205, where it is determined whether the sequence number of the received packet (RSN) is greater than or equal to the ESN. If the RSN is greater than or equal to the ESN, the process continues to act 207 where the packet is classified as an in-order packet. If the RSN is less than the ESN, the process continues to act 209 where the packet is classified as a non-in-order packet.

After the packet has been classified as either an in-order packet or a non-in-order packet, the process continues to act 211, where it is determined if there are more packets in the stream to be processed. If there are no more packets in the stream to be processed, the process ends. If there are more packets in the stream to be processed, the process continues to act 213, where it is determined if the RSN is the highest sequence number in the stream yet received. If the RSN is not the highest sequence number yet received, the process returns to act 203. If the RSN is the highest sequence number yet received, the process continues to act 215 where the ESN is set to one greater than the RSN (i.e., RSN+1), and the process returns to act 203.

The above-described process is one example of a process that can be used to classify a packet as an in-order packet or a non-in-order packet. It should be appreciated that any suitable process may be used, as the invention is not limited in this respect.

In some embodiments in which packets are classified as either in-order or non-in-order, non-in-order packets may be further classified into sub-classifications. Any suitable sub-classifications may be used as the invention is not limited in this respect.

For example, in the example of FIG. 2A, a received packet is classified as a non-in-order packet at act 209. In some embodiments, rather than proceeding to act 211, a non-in-order packet may be further classified into sub-classifications. The dashed lines exiting the box at act 209 indicate that in some embodiments, when a received packet is classified as a non-in-order packet, the process continues to act 211, and in other embodiments, when a received packet is classified as a non-in-order packet, the process continues to act 217 in FIG. 2B.

That is, in some embodiments, non-in-order packets may be further classified as either duplicate packets, reordered packets, or late packets. For example, when a received packet is classified as a non-in-order packet at act 209, the process may continue to act 217 in FIG. 2B to sub-classify the packet, rather than proceeding to act 211 (as shown in FIG. 2A).

Figure 2B:
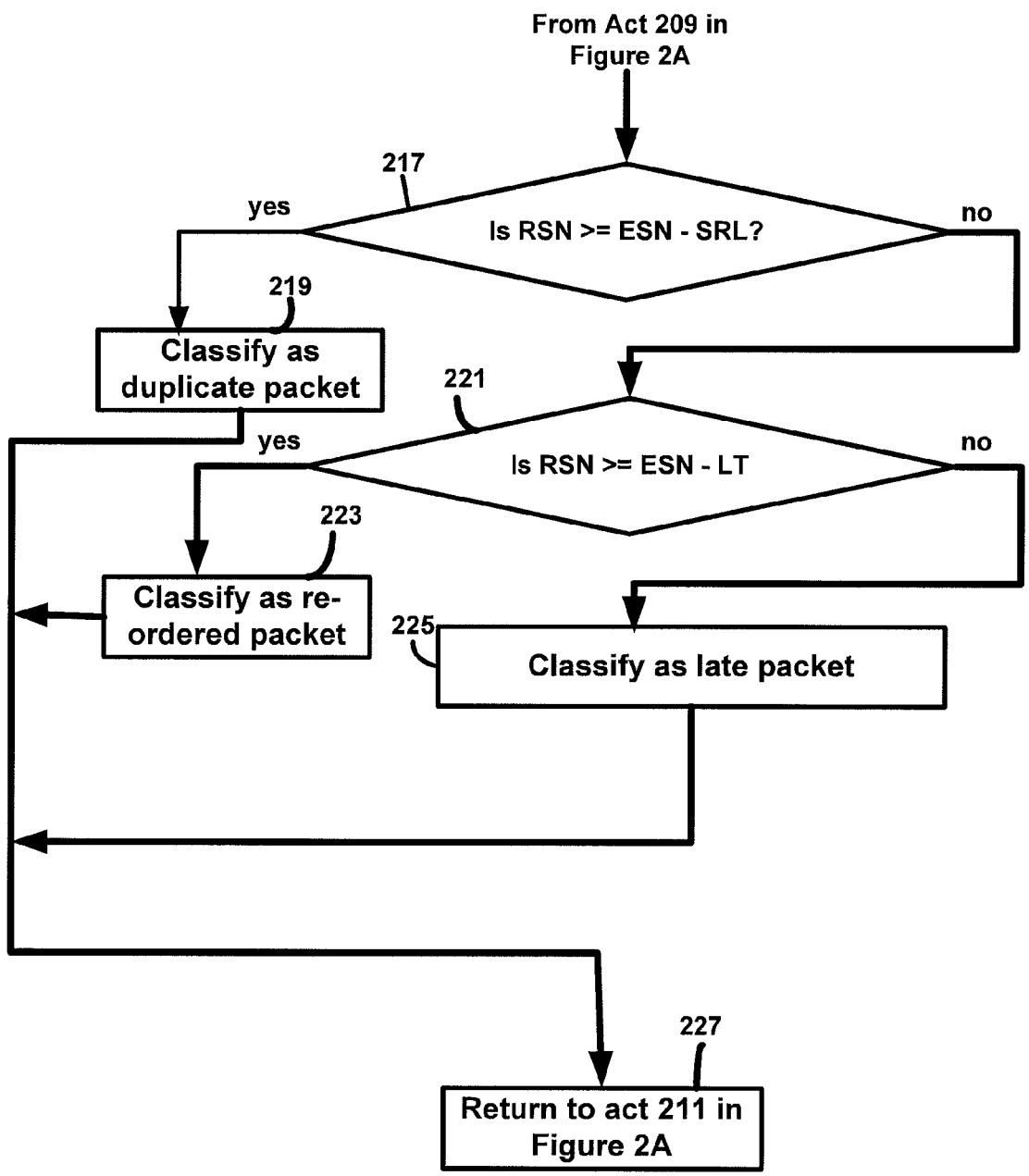

At act 217 in FIG. 2B, it is determined whether the RSN is greater than or equal to the ESN minus the current sequence run length (SRL). The current sequence run length is the number of packets with sequential sequence numbers received since the last discontinuity. A discontinuity occurs when the received sequence number (RSN) is greater than the expected sequence number (ESN). Packets that have a RSN less than the ESN are included in the sequence run (i.e., are not considered to end a sequence run) but are not counted in the sequence run length. Thus, for example, if the sequence of packets shown in Table 2 below is received, the current sequence run length would be 5 because the last discontinuity occurs when the packet with sequence number 5 is received and the current sequence run includes the packets with sequence numbers 5, 4, 6, 7, 8, and 9 (though the packet with sequence number 4 is not included in the sequence run length).

TABLE 2

2, 3, 5, 4, 6, 7, 8, 9

If the sequence of packets shown in Table 3 below is received, the current sequence run length would be 2, because the last discontinuity occurs when the packet with sequence number 16 is received, and the packets in the current sequence run are the packets with sequence numbers 16, 15, and 17 (though the packet with sequence number 15 is not counted in the current sequence run length).

TABLE 3

6, 7, 8, 9, 10, 11, 12, 13, 14, 16, 15, 17

The current sequence run length for a packet stream may be tracked in any suitable way, as the invention is not limited in this respect. For example, in some embodiments, the current sequence run length for a packet stream may, upon receipt of the first packet, be initialized to one. For every packet whose sequence number is one greater than the sequence number of the preceding packet, the current sequence run length may be incremented by one. If a packet is received whose sequence number is not one greater than the sequence number of the preceding packet, the current sequence run length may be reset to (or may remain at) one.

If at act 217 it is determined that the RSN is greater than or equal to the ESN minus the SRL, then the process may continue to act 219, where the packet is classified as a duplicate packet. A duplicate packet is a packet with a sequence number that has already been received in a previous packet.

For example, if the sequence of packets shown in Table 4 below is received, then after receipt of the packet with sequence number 7, the expected sequence number is 10 and the current sequence run length is 1. The expected sequence number minus the current sequence run length is 9. When the last packet in the sequence shown in Table 4 is received (i.e., the packet with sequence number 9), its sequence number is greater than or equal to the expected sequence number minus the current sequence run length (i.e. 10−1=9). Thus, it may be classified as a duplicate packet.

TABLE 4

2, 3, 4, 9, 8, 5, 6, 7, 9

Once the packet has been classified as a duplicate packet at act 219, the process may continue act 227, where the process returns to act 211 in FIG. 2A If, at act 217, it is determined that the RSN is not greater than or equal to the ESN minus the SRL, then process continues to act 227, where it is determined if the RSN is greater than or equal to the ESN minus the late threshold (LT).

The late threshold is a parameter that indicates the maximum difference allowed in sequence numbers before a packet is classified as being received late. The late threshold may be set in any suitable way, as the invention is not limited in this respect. For example, in some embodiments, the late threshold may be a user-configurable parameter.

If, at act 221, it is determined that the RSN is greater than or equal to the ESN minus the LT, the process continues to act 223, where the packet is classified as a reordered packet. The process then continues to act 227, where the process returns to act 211 of FIG. 2A.

If, at act 221, it is determined that the RSN is not greater than or equal to the ESN minus the LT, the process continues to act 225, where the packet is classified as a late packet. The process then continues to act 227, where it returns to act 211 of FIG. 2A.

In the example of FIG. 2B, the late threshold is used in classifying non-in-order non-duplicate packets as either reordered packets or late packets. The illustrative sequence of packets shown in Table 5 below further illustrates how the late threshold may be used for this purpose. That is, for example, if the sequence of packets shown in Table 5 below is received and the late threshold is set to five, then when the packet with sequence number 6 is received, the expected sequence number is 8. Thus, the expected sequence number minus the late threshold is 3 (i.e., 8–5). Because 6 is greater than 5, the packet with sequence number 6 may be classified as a reordered packet. When the packet with sequence number 8 is received, the expected sequence number is 15. Thus, the expected sequence number minus the late threshold is 10 (i.e., 15–5). Because 8 is less than 10, the packet with sequence number 8 is classified as a late packet.

TABLE 5

| 3, 4, 5, 7, 6, 11, 12, 13, 14, 8 |
| --- |

In the example above, the late threshold is set to five. It should be appreciated that this number is merely an example for illustrative purposes and the invention is not limited in this respect, as the late threshold may be set to any suitable number.

In the examples of embodiments discussed above in which packets in a stream may be classified as either in-order packets, duplicate packets, reordered packets, or late packets, it should be appreciated that these classifications are mutually exclusive. That is, a packet that falls into one of these classification does not fall into any of the other classifications. In addition, every received packet in a stream falls into exactly one of these classifications.

As discussed above, a classification scheme whereby the classifications are mutually exclusive and every received packet in a packet stream falls into exactly one classification provides the advantage that once a packet has been determined to fall into one classification, additional comparisons or evaluation need not be performed to determine if the packet falls into any of the other classifications. This reduces the processing time for classifying a received packet.

The classification of each packet may be tracked in any suitable way, as the invention is not limited in this respect. For example, in some embodiments, a counter may be maintained for each possible classification. Each time a packet is classified into a particular classification, the counter for that classification may be incremented by one.

For example, in embodiments in which packets are classified as either in-order packets, duplicate packets, reordered packets, or late packets, an in-order packet counter, a duplicate packet counter, a reordered packet counter, and a late packet counter may be maintained. Each time a received packet is classified as an in-order packet, the in-order packet counter may be incremented by one; each time a received packet is classified as a duplicate packet, the duplicate packet counter may be incremented by one; each time a received packet is classified as a reordered packet, the reordered packet may be incremented by one; and each time a received packet is classified as a late packet, the late packet counter may be incremented by one.

The above-described examples illustrate some techniques for classifying received packets in a packet stream. However, Applicants have appreciated that some packets in a packet stream may never be received. For example, the device responsible for transmitting the packets may fail to transmit some packets or the packets may be lost in transmission. Applicants have appreciated that it may be desirable to determine the number of lost packets (i.e., packets in a packet stream that are never received) in a packet stream.

Thus, in some embodiments, the number of lost packets in a packet stream may be tracked. This may be done in any suitable way, as the invention is not limited in this respect, and may be done in addition to or instead of classifying received packets using the classifications described above.

For example, in some embodiments, a lost packet counter may be maintained to count the number of lost packets. The lost packet counter may be initially set to zero. When a packet is received whose sequence number is greater than the expected sequence number the lost packet counter may be incremented. The amount by which this counter is incremented may be the difference between the received sequence number and the expected sequence number. For example, if the expected sequence number is 7 and the received sequence number is 9, the lost packet counter may be incremented by two.

When a packet is received whose sequence number is less than the expected sequence number minus the current run length, the lost packet counter is decremented by one, unless it is zero, in which case it remains at zero. For example, if the sequence of packets shown in Table 6 below is received, when the packet with sequence number 9 is received, the expected sequence number is 8. The difference between the received sequence number and the expected sequence number is 1 (i.e., 9–8). Thus, the lost packet counter may be incremented by 1. When the next packet is received (i.e., the packet with sequence number 8), the expected sequence number is 10 and the current sequence run length is 1. The expected sequence number minus the current sequence run length is 9 (i.e., 10–1). Because the received sequence number (8) is less than the expected sequence number minus the current sequence run length, the lost packet counter is decremented by 1.

TABLE 6

| 4, 5, 6, 7, 9, 8 |
| --- |

Applicants have appreciated that, in situations where the last packet or series of packets in a stream are lost, the lost packet counter may not account for those packets. As a result, the number of lost packets may be undercounted.

Some embodiments address this by using the total number of transmitted packets to adjust the lost packet count. That is, if the total number of transmitted packets is known, the expected sequence number minus one may be subtracted from the total number of transmitted packets. The resulting value may be added to the lost packet counter to account for any lost packets at the end of the packet stream.

As can be appreciated from the examples above, the amount of memory used to evaluate the sequence of a packet stream is low. For example, FIG. 7 shows the memory used to evaluate the sequence of a plurality of packet streams received concurrently in embodiments in which received packets are classified as either in-order packets, duplicate packets, re-ordered packets, or late packets, and in which the number of lost packets is counted. In FIG. 7, memory 701 includes: a plurality of storage locations 703 which are used to keep track of and store the expected sequence number for each packet stream; a plurality of storage locations 705 which are used to track and store the current sequence run length for each packet stream; a plurality of storage locations 707 which are used to count and store the number of received packets classified as in-order packets for each packet stream; a plurality of storage locations 709 which are used to count and store the number of received packets in each packet stream classified as duplicate packets; a plurality of storage locations 711 which are used to count and store the number of received packets in each packet stream classified as late packets, a plurality of storage locations 713 which are used to count and store the number of received packets in each packet stream classified as late packets; a plurality of storage locations 715 that are used to store the late threshold for each packet stream; and a plurality of storage locations 717 which are used to count and store the number of lost packets in each packet stream.

In embodiments in which packets are classified as either in-order packets or non-in-order packets (i.e., without further classifying the non-in-order packets) the amount of memory used to evaluate the sequence of a packet stream would be even lower, as the counters for duplicate packets, re-ordered packets, and late packets could be replaced with a single counter for counting received packets in the packet stream classified as non-in-order packets, and the current sequence run length and late threshold need not be stored.

Moreover, in embodiments in which lost packets are not counted, the amount of memory used to evaluate the sequence of packets in the packet stream could be reduced by not storing a counter for lost packets.

The amount of memory used for each storage location in FIG. 7 may be any suitable amount, as the invention is not limited in this respect. In some embodiments, the amount of memory used for each storage location may be based on the number of packets in the stream. For example, if a packet stream has 10,000 packets, the storage locations for the counters for each packet classification may each be 14 bits (e.g., because 10,000 is greater than $2^{13}$, but less than $2^{14}$).

As discussed above, using a relatively small amount of memory to evaluate the sequence of packets in a packet stream provides several advantages. First, because the amount of memory used to evaluate the sequence of packets in a packet stream is relatively small, the total amount of memory used is small when concurrently processing a large number of packet streams. This provides a cost savings in that a test instrument that is concurrently processing a large number of packet streams need not have a very large amount of memory in order to evaluate the sequence of packets in these streams.

In addition, because there are a relatively few number of memory locations to be updated upon receipt of packet, the amount of time needed to update these memory locations is small and facilitates processing of packet streams transmitted at high transmit speeds (e.g., 10 Gb Ethernet traffic). That is, in the example of FIG. 7, when a packet in a packet stream is received and classified, a small number of memory locations are updated. For example, if an in-order packet is received that results in a change of the expected sequence number, the current sequence run length, and the number of in-order packets received, only three storage locations in memory 701 are updated (i.e., storage locations 703, 705, and 707). In some situations, receipt of an in-order packet may also result in a change in the lost count, in which case four storage location memory 701 may be updated.

If a non-in-order packet is received, there are only three potential storage locations in memory 701 that may be updated (i.e., the current sequence run length, one of the duplicate counter, the re-ordered counter, and the late counter, and the lost counter). In many situations, less than three memory locations are updated.

Moreover, the number of storage locations that are accessed in order to classify a received packet is also small. In some situations, such as, for example, when an in-order packet is received, only a single memory location in memory 701 is read to classify the packet as the in-order packet (i.e., the expected sequence number at storage location 703). At most, only three memory locations in memory 701 are read to classify a received packet (i.e., the expected sequence number, the current sequence run length, and the late threshold). This helps keep the amount of time needed to classify a packet relatively small, and facilitates the concurrent processing of a large number of packet streams transmitted at high transmit speeds.

In the example of FIG. 7 a separate late threshold may be specified for each packet stream. However, the invention is not limited in this respect, as in some embodiments, a single late threshold may be specified that applies to all packet streams. In such embodiments, it may not be necessary to allocate a location in memory for each packet stream to store the late threshold. Rather, a single memory location that stores the late threshold may be allocated and used for all packet streams.

Some embodiments of the invention provide the advantages discussed above. However, not every embodiment provides all of these advantages and some embodiments do not provide any of these advantages. It should be appreciated that the invention is not limited to providing all or any of these advantages.

It should further be appreciated that the discussion of examples provided above includes descriptions of accessing a certain number of memory locations to classify a received packet and updating a certain number of memory locations upon receipt of a packet. It should be appreciated that these are non-limiting examples of some embodiments, and that the number of memory locations accessed or updated in these embodiments does not apply to every embodiment, and the invention is not limited in this respect.

The above-described embodiments employing techniques for classifying received packets and tracking the classifications of received packets may be implemented in any suitable way, as the invention is not limited in this respect. These embodiments may be implemented on any suitable computer or computers and may be implemented using hardware, software, or any combination thereof. When these embodiments (or portions thereof) are implemented in software, the software code can be executed on any suitable processor or collection of processors, whether provided in a single computer or distributed among multiple computers.

It should be appreciated that the above-described techniques for classifying and/or tracking the sequence of received network traffic may be applied to any suitable type of network data, as the invention is not limited in this respect. For example, these techniques may be applied to Ethernet network transmissions, Token Ring transmissions, Frame Relay transmissions, 802.11 transmissions, or any other suitable type of network transmissions.

It should be appreciated that any component or collection of components comprising hardware and/or software that perform the functions of the above-described embodiments can be generically considered as one or more controllers that control the above-discussed functions. The one or more controllers can be implemented in numerous ways, such as with dedicated hardware (e.g., one or more FPGAs), with general purpose hardware (e.g., one or more general purpose processors) programmed using microcode or software to perform some or all of these functions, and/or any combination thereof.

In this respect, it should be appreciated that one implementation of the embodiments of the present invention comprises at least one computer readable medium (e.g., a computer memory, magnetic disk, optical disc, flash memory, or other computer storage medium) encoded with a computer program (i.e., a plurality of instructions), which, when executed on a processor, perform some or all of the above-discussed functions of the embodiments of the present invention.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

Figure 3:
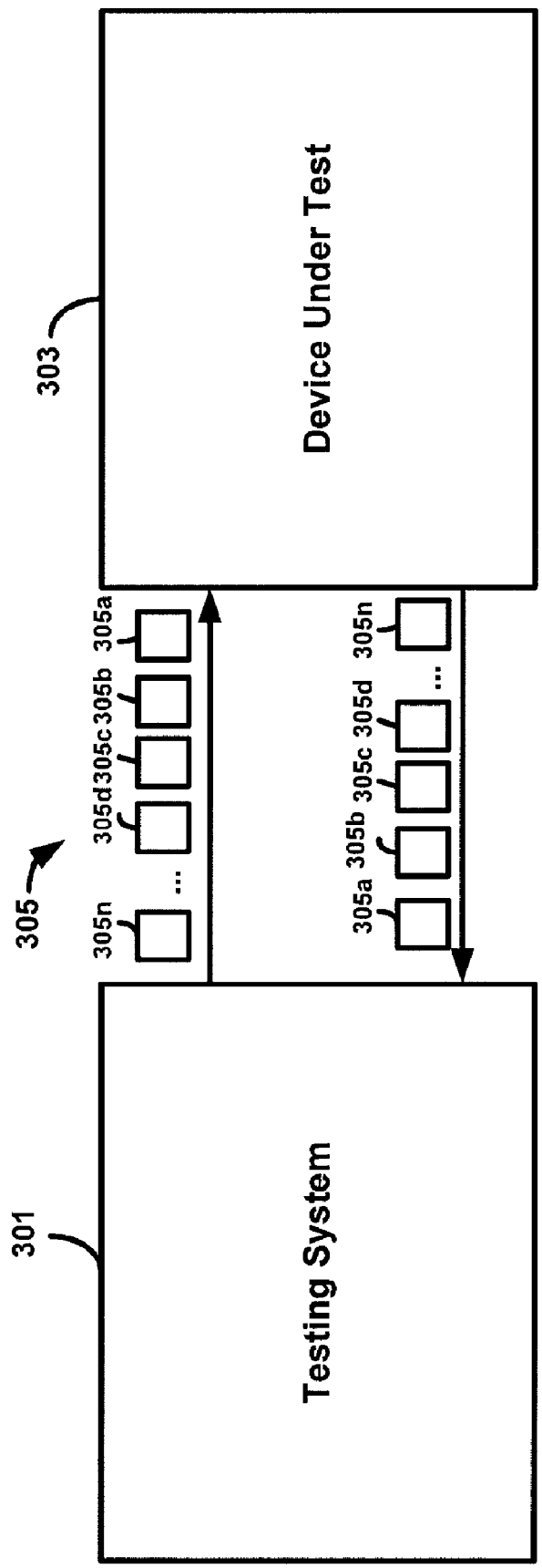
FIG. 3 is a block diagram of a computer system that includes an illustrative testing system in which some embodiments may be implemented, and a device under test.

Some embodiments of the invention may be implemented on a testing system, such as testing system 301 in FIG. 3. For example, in some embodiments, testing system 301 may generate packet stream 305 comprising packets 305a, 305b, 305c, 305d, . . . , 305n to a device under test 303. Device under test 303 may transmit the packets received from testing system 301 back to testing system 301 and testing system 301 may evaluate the sequence of packets in the packet stream received from device under test 303 using, for example techniques described above.

In the example of FIG. 3, testing system 301 sends a single packet stream 305 to device under test 303. However, the invention is not limited in this respect, as testing system 301 may concurrently send multiple packet streams to device under test 303, and packets from these streams may be intermixed in the transmission to the device under test. Moreover, in the example of FIG. 3 testing system 301 is coupled directly to device under test 303. However, the invention is not limited in this respect, as testing system 301 may communicate with device under test 303 in any suitable way, including, for example, via one or more other network devices.

In evaluating the sequence of a packet, the packet stream to which a packet belongs and the sequence number of the packet in that packet stream may be determined in any suitable way. For example, in some embodiments, when testing system 301 generates packets to be transmitted to a device under test, testing system 301 may embed a signature field in each transmitted packet and may include in the signature field a stream identifier that identifies the packet stream to which the packet belongs and the sequence number of the packet in the packet stream. When the device under test transmits these packets back to testing system 301, testing system 301 may determine the packet stream to which each packet belongs and the sequence number of each packet by looking in the signature field of the packet.

Testing system 301 may be implemented in any suitable way, as the invention is not limited in this respect. For example, in some embodiments, testing system 301 may be implemented as a chassis having multiple printed circuit boards that serve as either a packet generator/transmitter or packet receiver. In some embodiments, each printed circuit board may include hardware (e.g. one or more programmable gate arrays, such as a field programmable gate array (FPGA)) that performs packet generation and transmission functions and/or packet receiving and classifying functions.

Figure 4:
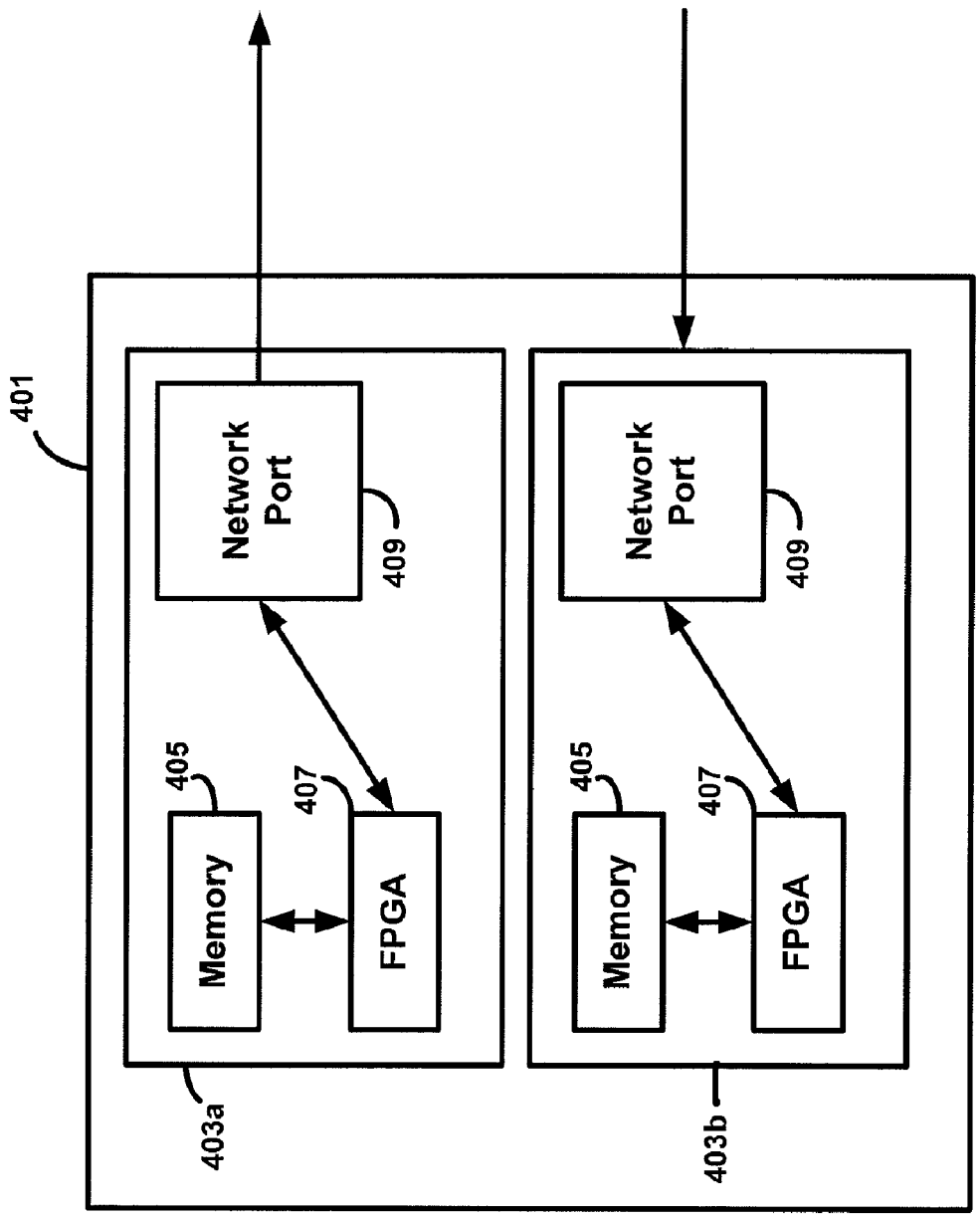
FIG. 4 is a block diagram of an illustrative testing system having multiple printed circuit boards in which some embodiments of the invention may be implemented.

FIG. 4 is a block diagram of an example of a testing system 401 having two printed circuit boards 403a and 403b. Each printed circuit board includes a memory 405, an FPGA 407, and a network port 409. Printed circuit board 403a may be used to generate packet streams to be sent to a device under test, and printed circuit board 403b may be used to receive packet streams from a device under test and process these packet streams.

For example, memory 405 in printed circuit board 403b may be used to store counters for counting the number of received packets in a stream in each classification, tracking the expected sequence number, and/or tracking the current sequence run length. Memory 405 in printed circuit board 403a may be used to store information used in the generation of packets.

Memory 405 may be implemented in either printed circuit board as any suitable type of memory, as the invention is not limited in this respect. For example, memory 405 may be either a volatile memory or a non-volatile memory, and may be implemented in any suitable way (e.g., as RAM, magnetic storage, optical storage, flash memory, or in any other suitable way).

FPGA 407 in printed circuit board 403a may access memory 405 to generate packets to be transmitted and may transmit these packets via network port 409 in printed circuit board 403a. FPGA 407 in printed circuit board 403b may receive packets via network port 409 in printed circuit board 403b, access memory 405 to classify these packets, for example using the techniques discussed above, and may update counters in memory 405 based on the classification of packets.

In the example of FIG. 4, printed circuit boards 403a and 403b each include only a single FPGA and single network port. It should be appreciated that an FPGA is only one example of hardware that may be used in embodiments of the invention and the invention is not limited to any particular hardware. For example, in some embodiments an application specific integrated circuit (ASIC) could be used by itself or in combination with an FPGA. In some embodiments, the functions described above as being performed by the FPGAs in the example of FIG. 4 may be performed in software executing on a general purpose processor, or may be performed using a combination of software executing on a general purpose processor and specialized hardware (e.g., an ASIC and/or FPGA).

In embodiments in which an FPGA is used, a printed circuit board may include any suitable number of FPGAs and any suitable number of network ports. Indeed, in some embodiments, a printed circuit board that generates and transmits packet streams may have an FPGA for each packet stream which it transmits and a printed circuit board that receives network traffic may have an FPGA for each packet stream that it is configured to receive and/or process.

In the example of FIG. 4, testing system 401 has two printed circuit boards (i.e, one transmit board and one receive board). However, the invention is not limited in this respect as any suitable number of printed circuit boards may be used.

Any number of these may be transmit boards and any number of these may be receive boards, as the invention is not limited in this respect. In some embodiments, different transmit printed circuit boards may be used for generating different types of network traffic and different receive printed circuit boards may be used for receiving and processing different types of network traffic. For example, one or more printed circuit boards may be used to generate Ethernet traffic, one or more printed circuit boards may be used to generate Token Ring traffic, and one or more printed circuit boards may be used to generate IEEE 802.3 traffic. Likewise, one more printed circuit boards may be used to receive and process Ethernet traffic, one or more printed circuit boards may be used to receive and process Token Ring traffic, and one or more printed circuit boards may be used to receive and process IEEE 802.3 traffic.

In some embodiments, testing system 401 may be configurable, such that printed circuit boards can be added and/or removed depending on what type(s) of simulated network traffic it is desired to generate.

Users may interact with testing system 301 to view test results and/or to configure tests in any suitable way, as the invention is not limited in this respect.

Figure 5:
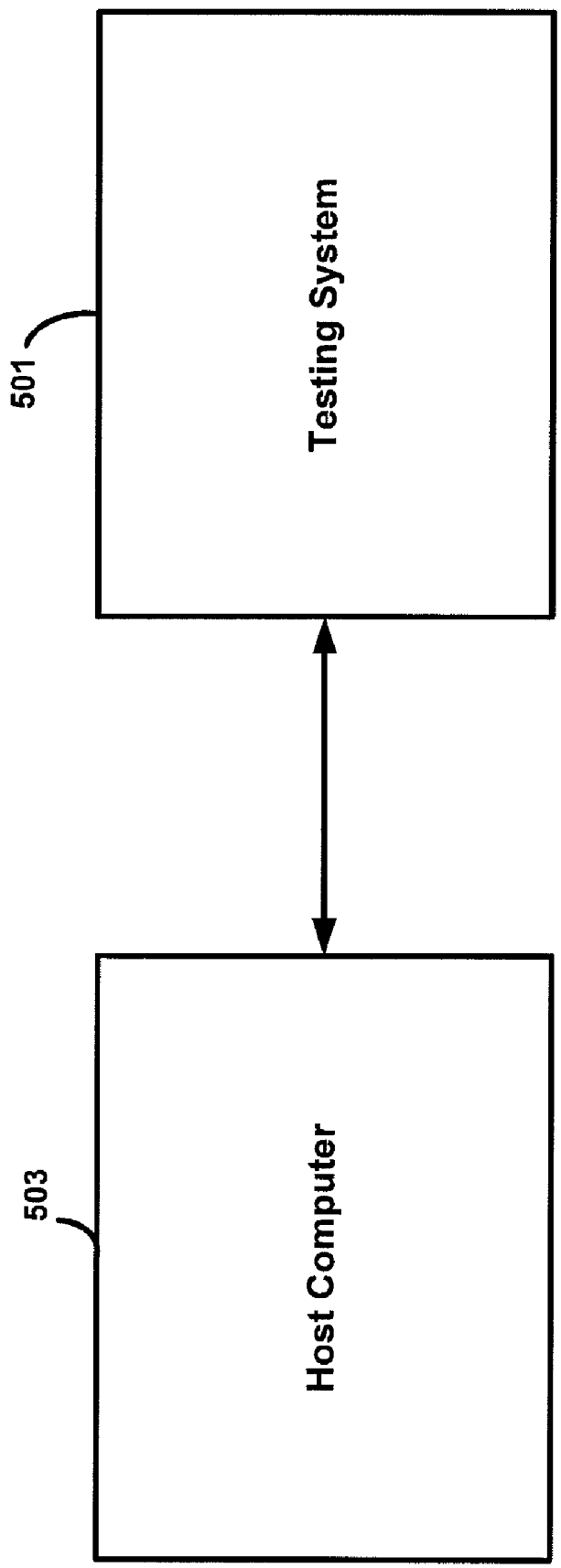
FIG. 5 is a block diagram of a host computer which may be used to configure and receive results from a testing system, in accordance with some embodiments.

For example, as shown in FIG. 5, in some embodiments a user may interface with testing system 503 via an application program executing on a host computer 501. The application program on host computer 501 may be used to configure tests to be run by testing system 503 and to specify any configuration parameters (e.g., a late threshold). The application program may receive results from the testing system and may display these results to the user.

Results may be displayed to the user in any suitable way, as the invention is not limited in this respect. For example, in some embodiments, results of a test may be displayed in a graphical user interface (GUI). The results of a test may be displayed graphically to a user via a GUI in any suitable way, as the invention is not limited in this respect.

Figure 6:
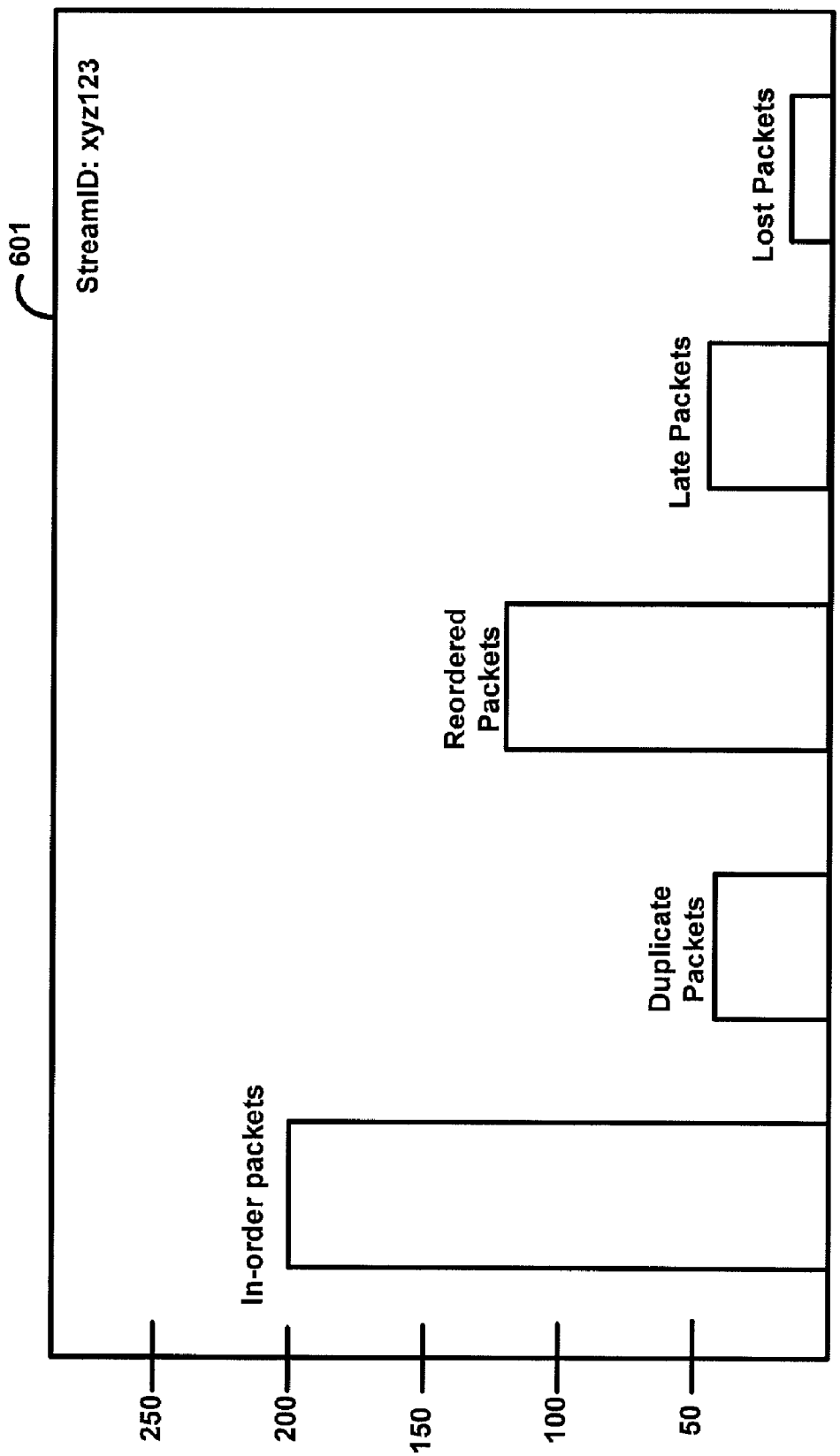
FIG. 6 is a diagram of graphical user interface for displaying results of a test, in accordance with some embodiments.

For example, as shown in FIG. 6, the application program may include a graphical user interface 601 that displays a histogram showing, for a given packet stream, the number of packets in that stream in each classification.

A histogram is only one example of a way in which test results may be displayed to a user. Any other display can be used, such as, for example a pie chart, a table, or any other suitable display.

It should be appreciated that the above-discussed illustrative implementations are merely examples of some possible implementations of some embodiments, and the invention is not limited to any particular implementation. Rather, the functionality of the embodiments described above may be performed in any suitable way using any suitable hardware, software, or any combination thereof.

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of evaluating sequence of a packet stream comprising a plurality of packets, wherein each of the plurality of packets has an assigned sequence number, the method comprising acts of:
   receiving a packet of the plurality of packets;
   determining the sequence number of the packet;
   comparing the sequence number of the packet to an expected sequence number indicative of the highest received sequence number in the packet stream;
   determining, based on the act of comparing, whether the sequence number of the packet is greater than or equal to the expected sequence number;
   when it is determined that the sequence number of the packet is greater than or equal to the expected sequence number, determining that the packet is an in-order packet;
   when it is determined that the packet is an in-order packet, incrementing a counter that counts the number of received in-order packets in the packet stream;
   when it is determined that the sequence number of the packet is not greater than or equal to the expected sequence number, determining whether the sequence number of the packet is greater than or equal to the expected sequence number minus a current sequence run length for the packet stream; and
   when it is determined that the sequence number of the packet is greater than or equal to the expected sequence number minus the current sequence run length for the packet stream, incrementing a counter that counts the number of received duplicate packets in the packet stream.

2. The method of claim 1, further comprising an act of:
   when it is determined that the sequence number of the packet is not greater than or equal to the expected sequence number minus the current sequence run length for the packet stream, determining whether the sequence number of the packet is greater than or equal to the expected sequence number minus a late threshold; and
   when it is determined that the sequence number of the packet is greater than or equal to the expected sequence number minus the late threshold, incrementing a counter that counts the number of received re-ordered packets in the packet stream.

3. The method of claim 2, further comprising an act of:
   when it is determined that the sequence number of the packet is greater than or equal to the expected sequence number minus the late threshold, incrementing a counter that counts the number of late packets in the packet stream.

4. The method of claim 3, further comprising an act of:
   determining whether the sequence number of the packet is greater than the expected sequence number; and
   when it is determined that the sequence number of the packet is greater than the expected sequence number, incrementing a counter that counts the number of lost packets.

5. The method of claim 4, wherein the act of incrementing the counter that counts the number of lost packets further comprises an act of:
   incrementing the counter that counts the number of lost packets by an amount equal to the sequence number of the packet minus the expected sequence number.

6. The method of claim 4, further comprising an act of:
   when it is determined that the sequence number of the packet is not greater than or equal to the expected sequence number minus the current sequence run length for the packet stream, decrementing the counter that counts the number of lost packets.

7. The method of claim 1, further comprising an act of:
when it is determined that the sequence number of the packet is greater than or equal to the expected sequence number, setting the expected sequence number to a value equal to the sequence number of the packet plus one.

8. The method of claim 1, further comprising an act of:
when it is determined that the sequence number of the packet is greater than the expected sequence number, setting the value of the current sequence run length to one.

9. The method of claim 1, further comprising an act of:
when it is determined that the sequence number of the packet is equal to the expected sequence number, incrementing the value of the current sequence run length.

10. A method of evaluating sequence of a packet stream comprising a plurality of packets, wherein each of the plurality of packets has an assigned sequence number, the method comprising acts of:
receiving a packet of the plurality of packets;
determining the sequence number of the packet;
based on the sequence number of the packet, determining in which of a plurality of mutually exclusive packet classifications the packet belongs, comprising:
comparing the sequence number of the packet to an expected sequence number indicative of the highest received sequence number in the packet stream;
determining, based on the act of comparing, whether the sequence number of the packet is greater than or equal to the expected sequence number;
when it is determined that the sequence number of the packet is greater than or equal to the expected sequence number, determining that the packet is an in-order packet;
when it is determined that the packet is an in-order packet, incrementing a counter that counts the number of received in-order packets in the packet stream;
when it is determined that the sequence number of the packet is not greater than or equal to the expected sequence number, determining whether the sequence number of the packet is greater than or equal to the expected sequence number minus a current sequence run length for the packet stream; and
in response to determining in which of the plurality of packet classifications the packet belongs, incrementing a counter for the one of the plurality of packet classifications in which the packet belongs, comprising:
when it is determined that the sequence number of the packet is greater than or equal to the expected sequence number minus the current sequence run length for the packet stream, incrementing a counter that counts the number of received duplicate packets in the packet stream.

11. The method of claim 10, wherein the plurality of mutually exclusive packet classifications comprise in-order packets and non-in-order packets.

12. The method of claim 10, wherein the plurality of mutually exclusive packet classifications comprise in-order packets, duplicate packets, re-ordered packets, and late packets.

13. The method of claim 10, further comprising an act of:
when it is determined that the sequence number of the packet is not greater than or equal to the expected sequence number minus the current sequence run length for the packet stream, determining whether the sequence number of the packet is greater than or equal to the expected sequence number minus a late threshold; and
when it is determined that the sequence number of the packet is greater than or equal to the expected sequence number minus the late threshold, incrementing a counter that counts the number of received re-ordered packets in the packet stream.

14. The method of claim 13, further comprising an act of:
when it is determined that the sequence number of the packet is greater than or equal to the expected sequence number minus the late threshold, incrementing a counter that counts the number of late packets in the packet stream.

15. The method of claim 14, further comprising an act of:
determining whether the sequence number of the packet is greater than the expected sequence number; and
when it is determined that the sequence number of the first packet is greater than the expected sequence number, incrementing a counter that counts the number of lost packets.

16. The method of claim 15, wherein the act of incrementing the counter that counts the number of lost packets further comprises an act of:
incrementing the counter that counts the number of lost packets by an amount equal to the sequence number of the packet minus the expected sequence number.

17. The method of claim 15, further comprising an act of:
when it is determined that the sequence number of the packet is not greater than or equal to the expected sequence number minus the current sequence run length for the packet stream, decrementing the counter that counts the number of lost packets.

18. The method of claim 14, further comprising acts of:
using the counter that counts the number of in-order packets, the counter that counts the number of re-ordered packets, the counter that counts the number of duplicate packets, and the counter that counts the number of late packets to display on a display screen information related to the number of in-order packets in the sequence of packets, information related to the number of reordered packets in the sequence of packets, information related to the number of duplicate packets in the sequence of packets, and information related to the number of late packets in the sequence of packets.

19. A packet sequence checking system comprising:
at least one input for receiving packets from a plurality of packet streams;
at least one memory storing a counter that counts a number of in-order packets received in one of the plurality of packet streams; and
at least one circuit, coupled to the input and the memory, that:
determines the sequence number of a received packet in the one of the plurality of packet streams;
compares the sequence number to an expected sequence number;
determines, based on the act of comparing, whether the sequence number of the received packet is greater than the expected sequence number;
when it is determined that the sequence number of the received packet is greater than the expected sequence number, determines that the received packet is an in-order packet;
when it is determined that the received packet is an in-order packet, increments the counter;
when it is determined that the sequence number of the received packet is not greater than or equal to the expected sequence number, determining whether the sequence number of the received packet is greater than or equal to the expected sequence number minus a current sequence run length for the one of the plurality of packet streams; and when it is determined that the sequence number of the received packet is greater than or equal to the expected sequence number minus the current sequence run length for the one of the plurality of packet streams, incrementing a counter that counts the number of received duplicate packets in the one of the plurality of packet streams.

20. The packet sequence checking system of claim 19, wherein the at least one circuit comprises at least one field programmable program array (FPGA).

21. The packet sequence checking system of claim 19, wherein the one of the plurality of streams of packets is a first of the plurality of packet streams, wherein the at least one memory storing a counter that counts a number of in-order packets received in a second of the plurality of packet streams, wherein the received packet is a first received packet, and wherein the at least one circuit:

determines the sequence number of a second received packet in the second of the plurality of packet streams;

compares the sequence number of the second received packet to an expected sequence number for the second of the plurality of packet streams;

determines, based on the act of comparing, whether the sequence number of the second received packet is greater than the expected sequence number for the second of the plurality of packet streams;

when it is determined that the sequence number of the second received packet is greater than the expected sequence number for the second of the plurality of packet streams, determines that the second received packet is an in-order packet; and when it is determined that the second received packet is an in-order packet, increments the counter that counts the number of in-order packets received in the second of the plurality of packet streams.

22. The packet sequence checking system of claim 19, wherein the at least one circuit:

generates network traffic; and transmits the network traffic to a device under test.

23. The packet sequence checking system of claim 21, wherein the network traffic comprises at least one of the plurality of packet streams.

24. The packet sequence checking system of claim 23, wherein the at least one circuit inserts sequence numbers into packets in the at least one of the plurality of packet streams.

25. The packet sequence checking system of claim 23, wherein the at least one circuit inserts a stream identifier into packets in the at least one of the plurality of packet streams.

26. The packet sequence checking system of claim 23, wherein the at least one input receives packets in the at least one of the plurality of packet stream from the device under test.

27. The packet sequence checking system of claim 19, wherein the memory further stores:

a counter that counts a number of received re-ordered packets in the packet stream;

a counter that counts a number of received duplicate packets in the packet stream; and a counter that counts a number of received late packets in the packet stream.

* * * * *